W. R. WILLIAMS.
VEHICLE SUSPENSION.
APPLICATION FILED MAY 19, 1922.
1,427,081.
Patented Aug. 22, 1922.
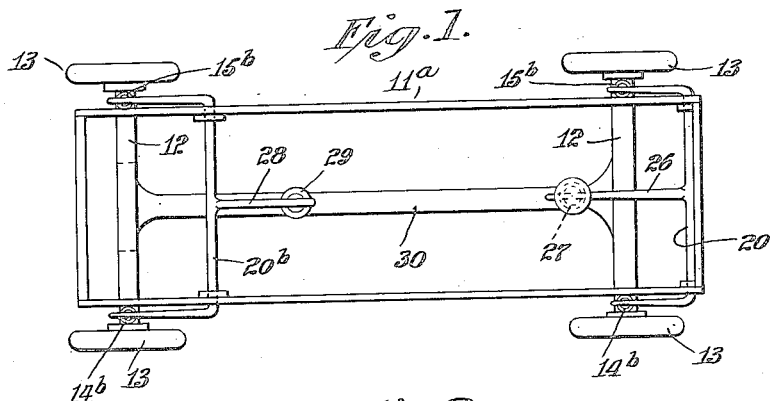
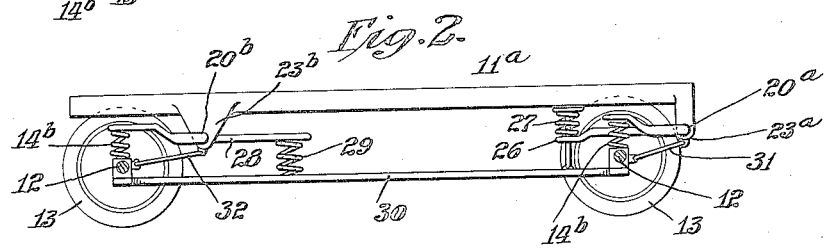
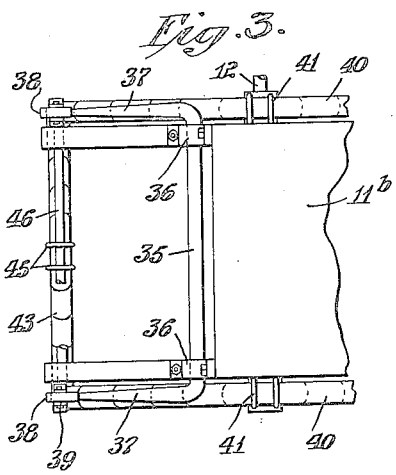
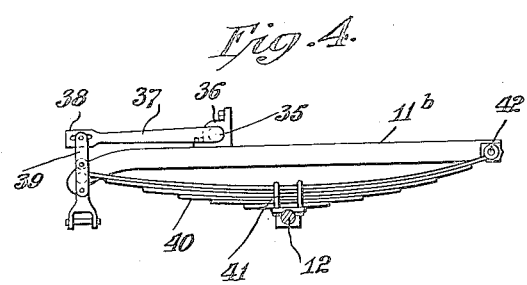
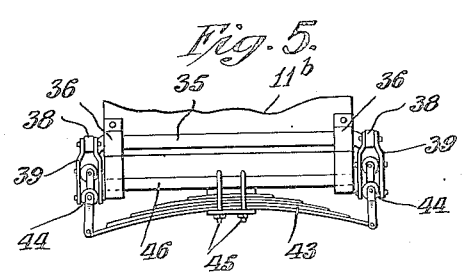
INVENTOR
William R. Williams
BY
Wm. J. Dolan,
his ATTORNEY

UNITED STATES PATENT OFFICE.

WILLIAM R. WILLIAMS, OF PHILADELPHIA, PENNSYLVANIA.

VEHICLE SUSPENSION.

1,427,081.

Specification of Letters Patent. Patented Aug. 22, 1922.

Original application filed November 7, 1921, Serial No. 513,354. Divided and this application filed May 19, 1922. Serial No. 562,271.

*To all whom it may concern:*

Be it known that I, WILLIAM R. WILLIAMS, citizen of the United States, and resident of Philadelphia, in the county of Philadelphia and State of Pennsylvania, have invented certain new and useful Improvements in Vehicle Suspensions, of which the following is a specification.

The subject-matter hereof constitutes a division of a co-pending patent application, filed on the 7th day of November, 1921, Serial Number 513,354. The improvement herein shown and described, like those covered by the companion case, may be applied to vehicles generally, but are particularly applicable to motor cars, of greater or less weight, designed to move at high speed.

Objects of the invention are to provide an improved vehicle suspension in which the degree of action of the elastic elements or springs usually employed may be greatly increased without in any way decreasing the stability of the vehicle; which shall be simple, durable, and economical in construction as well as highly efficient in operation; and whose parts shall be few, accessible, and easy of application. These and other objects of the invention will in part be obvious and in part be more fully explained in the following description.

The invention consists in the novel improvements, parts, combinations, and features of construction herein shown and described.

In the accompanying drawings, which are referred to herein and form part hereof, are illustrated various embodiments of the invention, the same serving in connection with the description herein to explain the principles of the invention.

Of the drawings:

Fig. 1 is a top plan view of one form of the invention applied to a motor car frame or chassis, the latter being shown in full and as mounted on wheels and axles;

Fig. 2 is a side elevation of this form of the invention;

Fig. 3 is a top plan view, illustrating the invention is another form;

Fig. 4 is a side view of the construction shown in Fig. 3; and

Fig. 5 is an end view of this construction, as seen from the left-hand side of both Figs. 3 and 4.

As ordinarily constructed, a motor car is provided with springs to give a certain degree of ease of motion to the vehicle. In order, however, to insure the stability of the suspended portion or body of the vehicle, the springs must be very rigid. This rigidity constitutes a serious defect in motor vehicles wherein a high degree of ease of motion is desirable but which is prevented by this rigidity of the springs or elastic elements. The defect here alluded to is remedied through the various arrangements of springs and stress-controlling devices incorporated in the forms of construction hereinafter described. The degree of elasticity which heretofore could be given to the elastic elements without affecting the equilibrium of the vehicle is represented in Figs. 1 and 2 by the helical springs $14^b$ and $15^b$. To give a desired degree of ease of motion to the vehicle, when running at high speed or upon encountering inequalities of road surface, longer or more flexible springs might be used, but with springs of this degree of flexibility applied in an ordinary manner, however, while great ease of motion, would be imparted, the suspended portion of the vehicle would tilt laterally or sway from side to side to a very dangerous extent upon any shifting of the load or upon encountering inequalities in the road surface. But, the advantageous effects of this extreme length of spring or degree of action of the elastic elements can be obtained without any attending excessive lateral tilting of the body of the vehicle, by the suspension constructed or arranged according to the present invention, which contemplates that the desired amplification of the elastic elements may be obtained by locating the means for effecting the same at any desired place where stress communicated to any supporting element may be transmitted by a controlling or stress-transmitting member to the means forming the amplification of the elastic elements.

It will be noted that the pairs of springs $14^b$, $15^b$ are connected by rigid stress-transmitting yoke members $20^a$ and $20^b$, provided at the front and rear ends, respectively, of the vehicle frame or chassis $11^a$. The yoke member $20^a$, as shown, has an inwardly extending arm, bar, or lever 26, which connects with a helical spring 27, located between it and the reach bar 30 below or frame $11^a$ above, so that any stress communicated, say to either one of the forward pair of springs will be transmitted to the said spring 27, and the elasticity of the device is amplified in the same manner as if the pair of springs were increased in flexibility instead of providing the spring 27. Similarly, the yoke member 20ᵇ is provided with an arm, bar, or lever 28, also extending inwardly of the vehicle, which connects with a spring 29, resting upon a reach bar 30, and bearing the same relation to the rear springs 14ᵇ and 15ᵇ, that the spring 27 bears to the forward springs 14ᵇ, 15ᵇ. Additional reach bars or braces 31, 32 further connect the axles 12 with the hangers or bearings 23ᵃ, 23ᵇ of the central yoke members 20ᵃ, 20ᵇ.

In Figs. 3, 4 and 5, is illustrated a modification of the invention which can be conveniently applied to certain types of motor cars, as now constructed. In this embodiment of the invention, as shown the controlling or stress-transmitting member connecting the springs on opposite sides of the car consists of a yoke generally similar to that represented in Figs. 1 and 2, having a main central portion 35, extending transversely of the back of the chassis or frame 11ᵇ, and rotatably secured thereto in a suitable manner, as in bearings 36. This yoke also has arms or levers 37, extending outwardly and at right angles to the central part 35, and each of these arms or levers has at its outer end a slotted portion 38. In each slotted portion 38 is bolted a depending shackle 39, and to each shackle is secured the outer end of one of a pair of springs 40, which are arranged at opposite sides of the chassis and are held at their centers by clips 41 to an axle 12, and at their inner ends by bolts 42 to the frame. While in practice perfect transverse parallel motion of a portion of the vehicle to the extent of movement due to a third amplifying spring, to which reference will presently be made, may not be obtained because of the construction of the mechanism, yet such motion should be maintained approximately parallel. The slots in the ends 38 are extended to a suitable degree to compensate for the distortion of the springs. To give additional ease of motion, a spring 43 is arranged transversely of the vehicle between the shackle 39, to which it is secured at its ends by shackle and universal joints 44, being fastened at its center by clips 45, to a bar 46, which is secured at its opposite ends to the rearwardly projecting portions of the side members of the chassis. It is understood that this suspension may be duplicated at the forward end of the vehicle, and that proper stops for the springs may be provided, as by the frame ends.

It will be obvious that different modifications of the invention may be used together on the same vehicle, one modification being used, for example, on the front of the vehicle, and another modification at the rear. It is likewise manifest that a vehicle suspension constructed in accordance with this invention will carry out the objects of the invention as hereinbefore mentioned, while possessing other advantages which will be apparent to those skilled in the art.

The invention in its broader aspects is not limited to the precise constructions shown and described nor to any particular construction by which the same may be carried into effect, as many changes may be made in the details without departing from the main principles of the invention and without sacrificing its chief advantages.

I claim:

1. A vehicle suspension including, in combination, a pair of elastic means disposed on opposite sides of the vehicle, a third elastic means located inwardly with relation to the same, and a stress transmitting member consisting of a yoke mounted to rock on the vehicle frame and having arms oppositely acted upon by said pair of elastic means and said third elastic means.

2. A vehicle suspension including, in combination, a pair of elastic means designed to support the vehicle frame from opposite sides thereof, a third elastic means located forwardly of the same, a rigid member in transverse parallel relation to the vehicle frame and mounted to rock thereon, levers projecting rearwardly from said member into engagement with said first-named means, and an arm extending forwardly of the member so as to bear upon said third means.

3. A vehicle suspension including, in combination, a pair of elastic means mounted on opposite sides of the vehicle, a third elastic means positioned rearward with relation to the same, a rigid member rockably mounted cross-wise of the suspended portion of the vehicle and substantially transversely parallel therewith, and levers extending rearwardly of said member into engagement with said third means and said pair of means.

4. A vehicle suspension including, in combination, elastic means disposed on opposite sides of the vehicle, a third elastic means located adjacent to the same, and a stress-transmitting device consisting of a rigid member rotatably mounted upon the suspended portion of the vehicle and having an abutment or abutments oppositely acted upon by said first means and said third means.

5. A vehicle suspension including, in combination, elastic means designed to support the vehicle from opposite sides thereof, a third elastic means located adacent to the same, a rigid member rotatably mounted upon the vehicle frame in transverse relation thereto, levers projecting from said member into engagement with said first means, and a third lever projecting from the member into opposing engagement with said third means.

6. A vehicle suspension including, in combination, elastic means transversely disposed upon the vehicle supporting means, a third elastic means positioned adjacent to the same, a rigid member rotatable crosswise of the suspended portion of the vehicle substantially in parallelism therewith, and levers extending from said member into opposing engagement with the said third elastic means and the first named elastic means.

7. A vehicle suspension including, in combination, elastic means constructively constituting a pair of suspension elements arranged transversely of and connecting with a stable means of support, elastic means constructively constituting a third elastic element, and a rigid member mounted to rock upon the suspended portion of the vehicle in transverse relation therewith, said rigid member engaging in opposed rotational relation the said third element and the said pair of elements.

8. A vehicle suspension including, in combination, a pair of springs disposed transversely upon an axle, a third spring means arranged adjacent thereto, a rigid rotatable member engaging with said pair of springs and said third spring means in opposing rotational relation, and journal mountings for said rigid member attached to the suspended portion of the vehicle in substantially horizontal parallel transverse relation therewith.

9. A vehicle suspension including, in combination, elastic means constructively constituting a pair of suspension elements transversely disposed upon a stable means of support, a rigid rocking member arranged crosswise of the suspended portion of the vehicle in transverse relation therewith, said member having an abutment or abutments engaged with said pair of elastic elements, and elastic means constructively constituting a third elastic element engaged with said rigid member in opposing rotational relation to said pair of elastic elements.

10. A vehicle suspension including, in combination, elastic means disposed at opposite sides of the vehicle and connected with a stable means of support, auxiliary elastic means, and a rigid member mounted to turn about a transverse axis upon the suspended portion of the vehicle and engaging said elastic means and said third means in opposed rotational relation.

11. A vehicle suspension including, in combination, elastic means disposed at opposite sides of the vehicle and connected with a stable means of support, a stress-transmitting device consisting of a rigid transverse member mounted to rock upon a suspended portion of the vehicle and acted upon by both of said elastic means in one direction of rotation, and auxiliary elastic means interposed between said stress-transmitting device and a suspended portion of the vehicle and acting on said device in the opposite direction of rotation.

12. A vehicle suspension including, in combination, elastic means disposed at opposite sides of the vehicle and connected with a stable means of support, a stress-transmitting device consisting of a rigid member rotatably mounted transversely upon a suspended portion of the vehicle and acted upon by both of said elastic means in one direction of rotation, and auxiliary, helical, compression-spring means interposed between said stress-transmitting device and a suspended portion of the vehicle and acting on said device in the opposite direction of rotation.

13. A vehicle suspension including, in combination, elastic means disposed at opposite sides of the vehicle and connected with a stable means of support, a stress-transmitting device consisting of a rigid member rotatably mounted upon a suspended portion of the vehicle and acted upon by both of said elastic means in one direction of rotation, and auxiliary, helical, compression-spring means acting on said device in the opposite direction of rotation.

14. A vehicle suspension including, in combination, elastic means disposed at opposite sides of the vehicle and connected with a stable means of support, a stress-transmitting device consisting of a rigid hinge member hingedly supported upon a suspended portion of the vehicle for movement about a transverse axis, said elastic means acting upon the free end of said hinge member in one direction of rotation, and auxiliary, helical, compression-spring means also acting upon the free end of said hinge member in the opposite direction of rotation.

15. A vehicle suspension including, in combination, elastic means disposed at opposite sides of the vehicle and extending transversely of and connected to a stable means of support extending transversely of the vehicle, a stress-transmitting device consisting of a rigid transverse member mounted to rock upon a suspended portion of the vehicle and acted upon by both of said elastic means in one direction of rotation, and auxiliary elastic means interposed between said stress-transmitting device and a suspended portion of the vehicle and acting on said device in the opposite direction of rotation.

16. A vehicle suspension including, in combination, a pair of semi-elliptic leaf springs disposed at opposite sides of the vehicle and extending transversely of and connected to a stable means of support extending transversely of the vehicle, a stress-transmitting device consisting of a rigid transverse member mounted to rock upon a suspended portion of the vehicle and acted upon by both of said springs in one direction of rotation, and auxiliary elastic means interposed between said stress-transmitting device and a suspended portion of the vehicle and acting on said device in the opposite direction of rotation.

17. A vehicle suspension, in combination, a pair of elastic means disposed on opposite sides of the vehicle and connected with a stable means of support, a stress-transmitting device consisting of a rigid transverse member mounted to rock upon a suspended portion of the vehicle and acted upon by both of said elastic means in one direction of rotation, and a third elastic means acting upon said stress-transmitting device in the opposite direction of rotation and co-acting at one end only of the vehicle frame with said device and said pair of elastic means.

18. The combination with the suspended portion of a vehicle, of a pair of transverse stable means of support adjacent each end of said suspended portion and two entirely independent spring suspensions each interposed between one of said two stable means of support and said suspended portion, each of said suspensions including a pair of elastic means disposed on opposite sides of the vehicle and connected with the associated stable means of support, a stress-transmitting device consisting of a rigid member mounted to rock transversely upon a suspended portion of the vehicle and acted upon by both of said elastic means in one direction of rotation, and a third elastic means acting upon said stress-transmitting device in the opposite direction of rotation.

Signed at New York city, in the county of New York and State of New York this 15th day of May A. D. 1922.

WILLIAM R. WILLIAMS.